Dec. 19, 1967  W. DONGUS  3,359,050
REFRIGERATION COUNTER FOR USE IN RETAIL STORES
Filed July 12, 1965
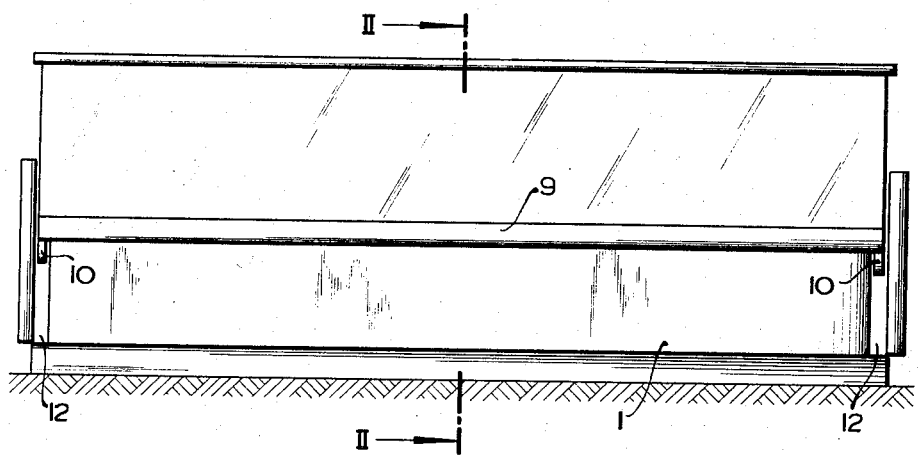
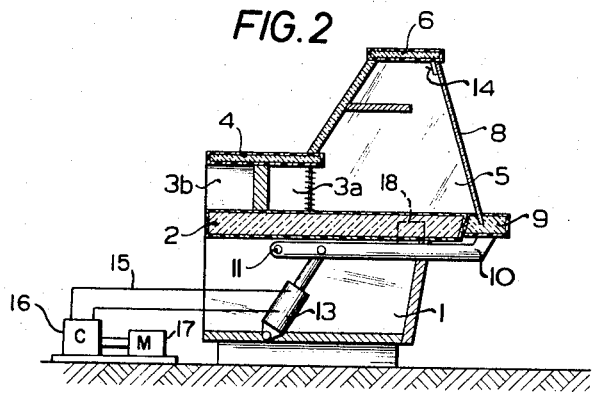
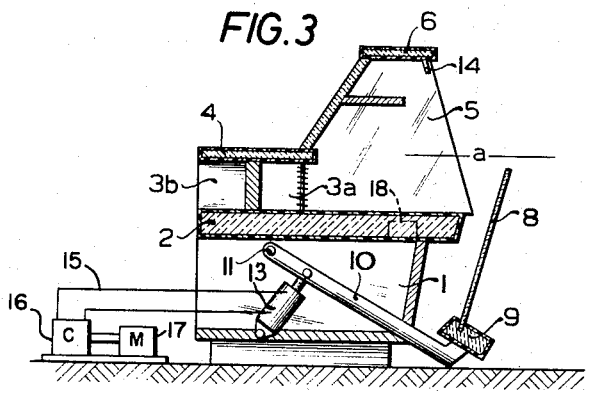
INVENTOR
Willi Dongus
By
Sparrow and Sparrow
ATTORNEYS

# United States Patent Office 3,359,050
Patented Dec. 19, 1967

3,359,050
REFRIGERATION COUNTER FOR USE IN RETAIL STORES
Willi Dongus, Deckenpfronn, Kreis Calw, Wurttemberg, Germany
Filed July 12, 1965, Ser. No. 471,309
Claims priority, application Germany, July 14, 1964, D 44,931
8 Claims. (Cl. 312—138)

ABSTRACT OF THE DISCLOSURE

A refrigeration counter, particularly for butcher shops, provided with a bar extending over the length of the counter in front thereof, said bar being adapted for supporting shopping bags, and a slightly rearwardly inclined transparent pane constituting the upper front face of the counter, the pane being mounted on the bar, pivotally swingable lever-arms supporting the bar and hydraulic cylinders supporting the lever arms so that the bar and the pane can be lowered in an almost vertical direction for cleaning of the counter and for placing merchandise therein.

---

The present invention relates to a refrigeration counter for use in retail stores, particularly in butcher shops, in which an upper portion of the front face consists of transparent pane which is slightly rearwardly inclined, which pane may be moved away for cleaning and filling of the refrigerated inner space and for cleaning of the inner face thereof.

In known refrigeration counters of this kind, the pane is arranged in such manner that it can be tilted upwardly about its upper longitudinal edge. This per se is advantageous, since the entire frontal area of the refrigerated space is entirely open and free and since the pane is accessible on its inner face for cleaning. However, a great disadvantage is that the pane is dangerously highly stressed in bending at its point of fastening when it is being swung upwardly into the horizontal plane. Furthermore, a weight compensation is needed which requires much construction expense in order to be able to move the comparatively heavy pane with a slight effort.

There are also constructions known in which the pane is divided in a vertical direction and in which the individual parts are horizontally movable relative to one another. It is not possible with this design to open the entire frontal area of the refrigeration space since the panes overlap one another. For this reason at least one partial pane cannot be cleaned on its inner face.

Eventually, constructions are known in which the front pane consists of wings which can be swung out about inclined vertical hinges. In this case, the individual wings must have frames which interrupt the transparent plan of the pane and which obstruct the view of the merchandise which is displayed in the refrigeration space. Besides, the outwardly swung wings require much space in front of the counter, which is not always available. Therefore, a subdivision of the pane into several small wings is indicated. This in turn requires a considerable construction, and the obstruction of the view caused by the frame members is particularly great.

It also has been suggested to arrange the entire frontal area, including the pane, in such manner that it may be moved forwardly. Although favorable conditions for cleaning and filling of the refrigeration area and for the cleaning of the pane are realized with this arrangement, much constructive expense is needed and the arrangement is highly unfavorable in that it requires much space in front of the counter.

SUMMARY

According to the present invention, which consists in the novel parts, construction arrangements, combinations and improvements, herein shown and described, the frontal transparent pane of the counter is attached on its lower edge to a longitudinal bar which preferably may be used as a support for shopping bags, which bar is fastened on the free ends thereof to at least two levers which extend rearwardly underneath the insulated bottom of the refrigeration space. These levers are swingably arranged on pivots which are fastened on transverse walls and can be moved in a vertical direction by drive means. They extend through slots in the front wall which permit the swinging movement. Thus, the pane including its supporting longitudinal bar can be swung downwardly from its slightly rearwardly inclined operating position, whereby it slightly protrudes forwardly in its lowered position because of the arrangement of the levers having pivotal points far back. The pane which is swung downwardly assumes a steeply upwardly directed position in which it is slightly stressed in bending. Its upper edge is so low that the whole front area of the refrigeration space is free. At the same time it has such a distance from the front edge of the bottom of the refrigeration space that its inner face is easily accessible from the top for cleaning purposes.

Hydraulic cylinders, connected with the individual levers, are preferably used as drive means for the swinging movement. These cylinders are connected simultaneously with a conventional pressure pump which is driven either by hand or by an electric motor. In the case of an electric drive of the pump, the upper end position can be controlled by a limit switch or by a pressure sensitive device which responds to a rise of pressure of the hydraulic fluid.

Objects and advantages of the invention will be set forth in part hereafter and in part will be obvious herefrom or may be learned by practicing the invention, the same being realized and attained by means of the instrumentalities and combinations pointed out in the appended claims. In the following description and in the claims, parts will be identified by specific names for convenience, but such names are intended to be as generic in their application to similar parts as the art will permit. Like reference characters denote like parts in the several figures of the drawing, in which:

FIG. 1 shows a front view of the refrigeration counter;
FIG. 2 shows a sectional view along the line II—II of FIG. 1; and
FIG. 3 shows the same sectional view as in FIG. 2, however, with the front pane in the lowered position.

Referring now in more detail to the drawing illustrating a preferred embodiment by which the invention may be realized, there is in FIG. 1 a refrigeration counter which has a substructure 1 which is covered by an insulated bottom 2. Above insulated bottom 2 of the refrigeration space, an area toward the rear of the vendor's side is provided which is covered by a work plate 4. This area is subdivided into an insulated compartment 3a for the evaporator and into a compartment 3b for storing of wrapping material, for drawers, etc. Evaporator compartment 3a is separated from the refrigeration space 5 by a jalousie wall.

Refrigeration space 5 is enclosed by bottom 2 and by glass walls at the end faces. The refrigeration space is open on the vendor's side above work plate 4 for taking out displayed merchandise. It is covered on top by a plate 6 which extends over its entire length. The front side of refrigeration space 5 is closed by a transparent plate 8, for example, by a glass pane.

Glass pane 8 is rearwardly inclined. The lower edge thereof is fastened to a bar 9 which extends longitudinally of the entire length of the counter, and may be used as a support for shopping bags. Bar 9 is attached to the free ends of lever arms 10 which extend rearwardly below refrigeration space bottom 2 in substructure 1 and which can swing in a vertical plan about studs 11 below compartment 3a. Studs 11 are fastened to the end faces of substructure 1 and coaxially aligned. The front wall of substructure 1 has slots 12 (see FIG. 1) through which lever arms 10 protrude forwardly. For counters of great length, bar 9 is supported by more than two lever arms 10, whereby the intermediate lever arms are pivotally suspended on intermediate partition walls of substructure 1.

An operating drive is attached to each one of lever arms 10. This drive is shown in the example in FIGS. 2 and 3 as consisting of a swingable hydraulic cylinder 13 connected by pipe lines 15 to a conventional common pressure pump 16 which may be driven by an electric motor 17 or by hand.

FIG. 2 shows the normal operating position in which pane 8 closes refrigeration space 5 in a slightly rearwardly inclined position in front of the buyer's side of the counter. In this position the upper edge of pane 8 abuts against a bar 14 which is attached to the underside of top plate 6.

FIG. 3 shows lever arms 10 with bar 9 and pane 8 in the downward swung position. Thus pane 8 assumes a position which is slightly forwardly inclined (to the buyer's side). The upper edge of pane 8 now is so low that refrigeration space 5 is readily accessible from the front side for cleaning and refilling. Pane 8 is at a distance from the front edge of bottom 2, which is sufficient for cleaning pane 8 on the inside thereof by reaching from the upper edge down.

While the invention has been described and illustrated with respect to a certain preferred example which gives satisfactory results, it will be understood by those skilled in the art after understanding the principle of the invention that various other changes and modifications may be made without departing from the spirit and scope of the invention, and it is intended therefore in the appended claims to cover all such changes and modifications.

I claim:

1. In a refrigeration counter for use in retail stores having a refrigeration space having a floor, said counter having end walls and a front wall, the combination with a slightly rearwardly inclined transparent pane constituting the upper part of said front wall, said pane movably arranged for cleaning the inner face thereof and for filling said refrigeration space, of a bar longitudinally extending along said counter, said bar being adapted for the use of supporting shopping bags, said bar having the lower edge of said transparent pane firmly attached thereto, at least two lever arms extending rearwardly underneath said bottom, the free ends of said lever arms carrying said bar, studs attached to said end walls, said studs pivotally supporting said lever arms, and power driven means for swinging said lever arms in vertical direction, said lever arms extending through slots in said front wall.

2. In a refrigeration counter according to claim 1, and said power driven means comprising hydraulic cylinders linked to each one of said lever arms, and a pump supplying hydraulic fluid to said hydraulic cylinders.

3. A refrigeration counter according to claim 2, and said pump comprising means for a manual drive.

4. In a refrigeration counter according to claim 2, and comprising electric drive means for said pump.

5. In a refrigeration counter according to claim 4, and comprising a limit switch controlling said electric drive means in the uppermost position of said lever arms.

6. In a refrigeration counter according to claim 4, and comprising a pressure switch controlling said electrically driven pump in the uppermost position of said lever arms by way of the rising fluid pressure in said hydraulic cylinders.

7. In a refrigeration counter for use in retail stores or the like having a refrigeration space and provided with a bottom, said counter having end walls and a front wall provided with slots, the combination with a rearwardly inclined transparent plate constituting the upper part of said front wall, said plate movably arranged for cleaning the inner face thereof and for filling said space, of a member longitudinally extending along said counter, said member being adapted for supporting shopping bags and the like, the lower edge of said plate being secured to said member, rearwardly extending lever means, the free ends of said lever means carrying said member, means attached to said end walls pivotally supporting said lever means, and means for swinging said lever means in substantially vertically direction, said lever means extending through said slots.

8. In a refrigerating counter according to claim 7, and said means for swinging said lever means comprising hydraulic means linked to said lever means.

References Cited
UNITED STATES PATENTS

| | | | |
|---|---|---|---|
| 559,159 | 4/1896 | Bower | 312—139 |
| 1,435,441 | 11/1922 | Zsoloos. | |
| 2,150,195 | 3/1939 | Valade | 312—139 |
| 2,276,338 | 3/1942 | Potter et al. | 60—52 |
| 2,390,030 | 11/1945 | Paulson | 312—223 |
| 2,741,477 | 4/1956 | Mercier | 60—52 |
| 3,059,985 | 10/1962 | Peck | 312—319 X |

BOBBY R. GAY, *Primary Examiner.*

J. L. KOHNEN, *Examiner.*